Figure 1:
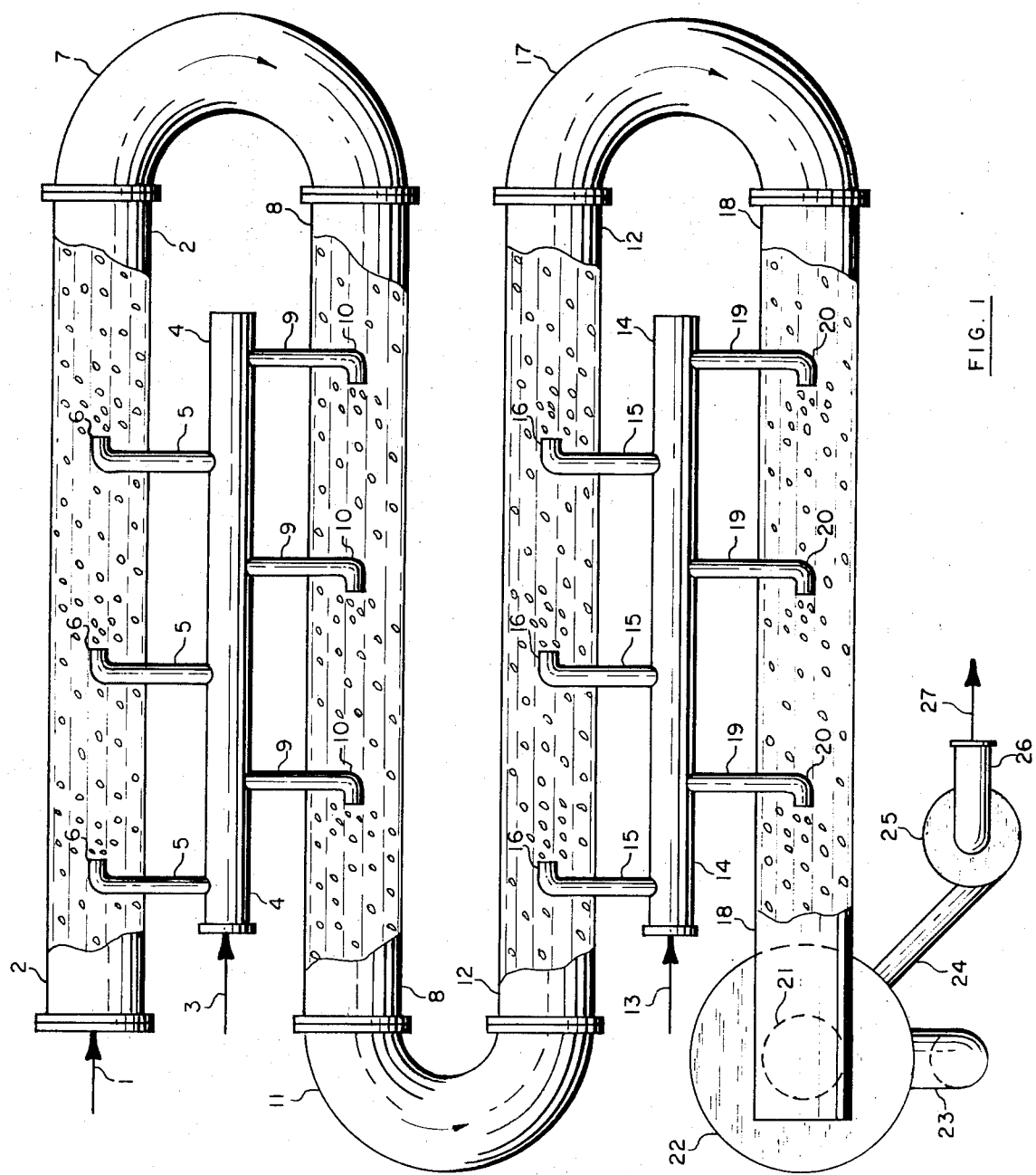

United States Patent

Shah

[15] 3,696,929
[45] Oct. 10, 1972

[54] APPARATUS FOR THE OXIDATION OF LIQUIDS

[72] Inventor: Indravadan S. Shah, Forest Hills, N.Y.

[73] Assignee: Chemical Construction Corporation, New York, N.Y.

[22] Filed: Nov. 27, 1970

[21] Appl. No.: 73,385

Related U.S. Application Data

[62] Division of Ser. No. 730,294, May 20, 1968, Pat. No. 3,549,314.

[52] U.S. Cl. ..................210/199, 23/49, 23/283, 210/63, 210/220, 261/124
[51] Int. Cl. .................................................C02c 5/04
[58] Field of Search ..23/49, 283, 285; 210/199, 220, 210/63

[56] References Cited

UNITED STATES PATENTS

| | | | |
|---|---|---|---|
| 1,333,328 | 3/1920 | Martin | 23/285 |
| 1,806,204 | 5/1931 | Jorgensen | 261/124 X |
| 2,570,460 | 10/1951 | Kress | 23/283 |
| 2,820,700 | 2/1958 | Saxton | 261/123 X |
| 3,362,868 | 1/1968 | Backlund | 162/30 |

*Primary Examiner*—Michael Rogers
*Attorney*—J. L. Chaboty

[57] ABSTRACT

Black liquor is oxidized in a sinuous pipe or duct oxidizer, by dispersing an oxygen-containing gas into the continuous black liquor phase flowing within the duct. The gas is passed into the black liquor at spaced intervals, and the resulting dispersion of gas in oxidized black liquor is discharged into a vessel or other container below the level of the body of liquor in the vessel. Fully oxidized black liquor is removed from the vessel at a regulated rate, so as to maintain the level of liquor in the vessel, and oxygen-depleted gas is also removed from the vessel. The oxygen-depleted gas removed from the vessel may contain residual foam or entrained liquid droplets. In this case, the gas is passed through a mechanical foam breaker or a cyclonic gas-liquid separator, with separated black liquor being recycled to the vessel.

9 Claims, 3 Drawing Figures

INDRAVADAN S. SHAH
INVENTOR.
BY J. T. Chaloty
AGENT

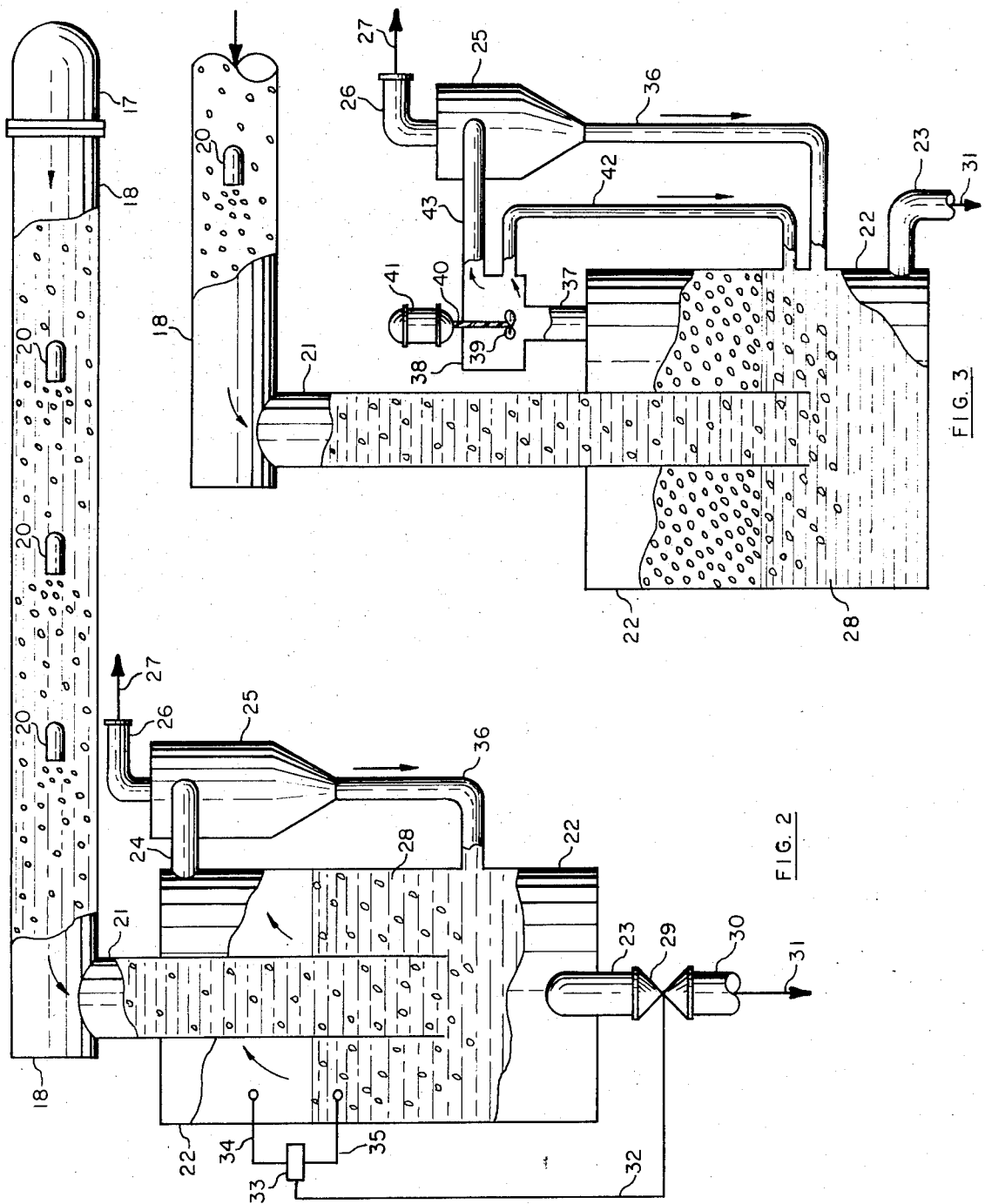

APPARATUS FOR THE OXIDATION OF LIQUIDS

The present application is a division of U.S. Patent application Ser. No. 730,294 filed May 20, 1968 and now U.S. Pat. No. 3,549,314.

BACKGROUND OF THE INVENTION

1. Field of the Invention

The invention relates to the processing of black liquor, which is produced during the digestion or processing of wood pulp. The black liquor is effectively oxidized by means of an improved method and apparatus, prior to or after evaporative concentration and recycle. The improved method and apparatus serves to contact the black liquor with an oxidizing gas stream consisting of an oxygen--containing gas such as air, oxygen-enriched air or substantially pure oxygen, which converts sulfides to sulfates and thiosulfates, and prevents pollution and the loss of sulfur compounds during the subsequent processing of the black liquor.

2. Description of the Prior Art

In the kraft pulping industry, oxidation of black liquor has been widely practiced. Black liquor oxidation is now an integral part of the kraft pulping and recovery process, rather than a requirement to solve air and water pollution problems. This is a direct result of various benefits, such as increased sulfidity, lower lime requirement, reuse of evaporator condensate, etc., attained due to oxidation of black liquor. In addition, black liquor oxidation has become an integrated part of the kraft recovery process because of its high potential for reducing pollution and because of its potential for reducing sulfur losses. The development of various oxidation systems is a direct result of continuing research to reduce the emission of odorous gases which contribute to the typical characteristic odors associated with kraft pulping.

From an air pollution point of view, the retention of sulfur compounds such as mercaptides, sulfides and disulfides in black liquor by stabilization is very essential. The concentration of the various constituents in the black liquor varies from mill to mill, as well as from time to time within a mill. The reasons for this are variations in the operating conditions, the type of wood being used and the type of pulp being produced. However, it is well established that sulfur compounds such as mercaptides, sulfides and disulfides are present in all cases.

The oxidation of black liquor converts the sodium sulfide content to sodium thiosulfate or sodium sulfate. When oxidized liquor is fired into the recovery furnace, the sodium thiosulfate will decompose in the furnace to sodium sulfite and sulfur. In an oxidizing atmosphere, which is usually present in the furnace, the elemental sulfur is converted to sulfur dioxide which reacts with sodium carbonate to form sodium sulfite. All of the sodium sulfite formed in the furnace is usually further oxidized to sodium sulfate.

The amount of sulfur dioxide emission from the recovery furnace is proportioned to the concentration of sodium thiosulfate in the black liquor. Theoretically, for every mole of sodium sulfide oxidized, one-half mole of sulfur dioxide should be emitted. However, due to high availability of sodium carbonate in the recovery furnace, the actual emission is less. It is an observed fact that for a mill practicing oxidation, the sulfur dioxide concentration in the flue gases leaving the recovery furnace should increase. This sulfur dioxide is readily and efficiently absorbed in a suitable gas scrubber, such as a venturi contactor.

The oxidation of weak black liquor offers more benefits than strong black liquor oxidation. In mills using pine wood furnish, weak black liquor oxidation has not been practiced due to the formation of excessive foam which has been found difficult to handle.

During concentration of unoxidized black liquor in multiple effect evaporators, as a result of hydrolysis, sodium sulfides and mercaptides are converted to hydrogen sulfide and methyl mercaptans. Because of their low vapor pressure, methyl mercaptans, hydrogen sulfide and methyl sulfide will be released, and thus the multiple effect evaporator becomes one of the largest sources of gaseous sulfur losses in the kraft recovery process.

The recovery furnace is the largest single source of gaseous sulfur losses in the form of hydrogen sulfide, sulfur dioxide, mercaptans and disulfides. Another source for emissions of gaseous sulfur loss is the direct contact evaporators, where carbon dioxide from recovery furnace flue gases reacts with sodium sulfide of black liquor, and thus releases hydrogen sulfide. The digester and blow tank are two other sources of gaseous sulfur compound emission. As much as 30 to 50 kg. of sulfur compounds are lost per ton of pulp produced if no special attention is given to prevent these losses.

Several methods have been proposed for reducing the gaseous sulfur losses from pulp mills. Among the various methods available for reduction of odor and sulfur losses, black liquor oxidation is found to be the most effective in reducing sulfur losses from multiple effect evaporators, direct contact evaporators and recovery furnace. In addition to reduction in odorous gaseous emission, the oxidation of black liquor offers other advantages in most instances of application. One advantage is the possibility of attaining higher sulfidity of cooking liquor than is ordinarily possible with salt cake make-up. Another advantage is the possible reuse of multiple effect evaporator condensate in the pulp mill. An advantage is a reduction in lime requirement for causticizing due to increased sulfidity. When increased sulfidity is not desired, soda ash or caustic soda may be used as partial alkali make-up. If added to the direct contact evaporator or scrubber, an increase in absorption of hydrogen sulfide and sulfur dioxide can be obtained. Another advantage of black liquor oxidation is increased soap yield. An advantage is more improved and uniform operation of multiple effect evaporators. In general, there is also a reduction of corrosion in the apparatus of the system and process units. An advantage is obtained due to an improvement in the combustion properties of black liquor when burned in the recovery furnace. Finally, a significant reduction in chemical loss is achieved.

The prior art relative to the processing, evaporation and combustion of black liquor includes U.S. Pat. Nos. 1,996,526; 2,027,115; 2,064,953 and 2,333,193, and U.S. Patent application No. 704,054 filed Feb. 8, 1968 and now issued as U.S. Pat. No. 3,574,051. Other patents relative to the contact between gas or vapors and liquids or solids include U.S. Pat. Nos. 2,378,157; 2,564,078; 2,591,343 and 3,172,922.

SUMMARY OF THE INVENTION

In the present invention, a method and apparatus are provided for oxidation of black liquor, in which the black liquor is passed through a sinuous or serpentine duct, which may be in the form of a pipe. At different locations and spaced intervals, an oxygen-containing gas such as air, oxygen-enriched air or substantially pure oxygen is injected into the duct, in equal or different proportions, in order to obtain maximum driving force required to covert sodium sulfide to sodium sulfate or sodium thiosulfate. The oxygen-containing gas will be in contact with liquor throughout the length of the duct or pipe. The sodium sulfide content of the liquor will be decreasing from inlet to outlet of the duct, however, by introducing fresh gas at different points, the oxygen content can be maintained constant. This will provide maximum driving force for oxidation. Foam formation can be restricted by selecting a proper sized pipe or duct. In addition, the liquor velocity and turbulence can be controlled so as to inhibit foam formation. The duct outlet, through which the mixture of oxidized black liquor and dispersed gas bubbles is discharged, will be submerged in an oxidized black liquor retention tank, so that all of the oxidized liquor and oxygen-depleted gas discharges under a liquor head, which helps to reduce the tendency of foam formation. By changing the length and size of the duct or pipe for a particular installation, the retention time can be easily changed. This aids in selecting a proper retention time, so that the oxygen usage is maximum.

The advantages of the invention include relatively simple and compact equipment requirements, and a better control of foam formation. In addition, a more effective usage of oxygen is obtained, whether it is supplied in the form of air, pure oxygen or oxygen-enriched air. The method and apparatus of the present invention are suitable for the oxidation of both weak and strong black liquor. Finally, the power requirement for operation of the system is very low.

It is an object of the present invention to oxidize black liquor in an improved manner.

Another object is to provide an improved apparatus for the oxidation of black liquor.

A further object is to provide an apparatus for black liquor oxidation which is relatively simple to fabricate, operate and maintain.

An additional object is to provide a method and apparatus which attains substantially complete oxidation of black liquor, regardless of variations in liquor flow rate and sodium sulfide content.

Still another object is to provide a method and apparatus which efficiently reduces the formation of foam during oxidation, and causes no operating problems.

Still another object is to provide a method and apparatus which efficiently oxidizes the black liquor at minimum operating cost.

These and other objects and advantages of the present invention will become evident from the description which follows:

DESCRIPTION OF THE DRAWINGS AND PREFERRED EMBODIMENTS

Referring to the drawings,

FIG. 1 is a plan view of one embodiment of the apparatus of the present invention, FIG. 2 is an elevation view of FIG. 1, and FIG. 3 is an elevation view of a section of an alternative embodiment of the invention.

Referring now to FIG. 1, unoxidized black liquor stream 1 is derived from a wood pulp process, and may consist of weak or dilute black liquor directly derived from wood pulp digestion, or strong black liquor produced by prior concentration of weak black liquor, which is usually attained by multiple effect evaporation. Stream 1 typically contains in the range of about 10 percent to 30 percent total dissolved solids concentration including in the range of about 2 to 8 grams per liter of sodium sulfide, and is at an initial temperature typically in the range of about 50° to 150°C. Stream 1 is passed into the inlet end of a first straight linear duct section 2 for initial oxidation at a pressure in the range of about 2 kg./sq.cm. to 20 kg./sq.cm. An oxygen-containing gas stream 3, which generally consists of air, oxygen-enriched air or substantially pure oxygen, is passed into the straight linear gas manifold 4, which is disposed parallel with duct section 2. A first plurality of spaced apart pipes 5 extend from manifold 4 into duct 2, and each of the pipes 5 is provided with a curved terminal extension 6 within duct 2. Oxygen-containing gas is transferred from manifold 4 through pipes 5, and discharged from the pipes 5 through extensions 6, so that oxygen-containing gas is centrally dispersed into the black liquor in the duct section 2 as discrete gas bubbles. The curved sections 6 preferably discharge the oxygen-containing gas axially as discrete bubbles in the direction of black liquor flow.

Due to the dispersion of gas bubbles into the black liquor in section 2, a partial oxidation of the black liquor takes place, and the resulting dispersion of oxygen-depleted gas bubbles in partially oxidized black liquor passes into curved duct section 7. The curved section 7 is preferably in the form of a semi-circle, and transfers the liquor dispersion into a second straight linear duct 8, which is parallel with and spaced away from duct section 2, so that manifold 4 is disposed between and parallel with the duct sections 2 and 8. A second plurality of spaced apart pipes 9 extend between manifold 4 and duct section 8, and a portion of the oxygen-containing gas stream 3 passes from manifold 4 through pipes 9, and is dispersed into the black liquor in duct section 8 at spaced intervals via curved extensions 10. Due to the spaced apart injection of further oxygen-containing gas bubbles into the black liquor in duct section 8 via axial curved extensions 10, further oxidation of the black liquor phase takes place in section 8 and the concentration of free oxygen in the dispersed gas bubbles phase remains substantially constant, while the concentration of sodium sulfide in the black liquor phase decreases at a substantially uniform proportion or linear rate as the black liquor flows through sections 2 and 8.

The resulting dispersion of oxygen-depleted gas bubbles in further oxidized black liquor passes from duct 8 into curved duct section 11. The curved section 11 is preferably in the form of a semi-circle, and transfers the liquor dispersion into a third straight linear duct 12, which is parallel with and spaced away from linear duct section 8. The dispersion of oxygen-depleted gas bubbles in partially oxidized black liquor flows from curved duct section 11 into straight duct section 12 for further oxidation of black liquor. An oxygen-containing gas stream 13, which is generally similar in composition to stream 3 described supra, is passed into the straight linear gas manifold duct 14, which is disposed parallel with duct section 12. A third plurality of spaced apart pipes 15 extend from manifold 14 into duct 12, and each of the pipes 15 is provided with a curved terminal extension 16 within duct 12. Oxygen-containing gas is transferred from manifold 14 through pipes 15, and discharged from the pipes 15 through extensions 16, so that oxygen-containing gas is centrally dispersed into the black liquor in the duct section 12 as discrete gas bubbles. The curved sections 16 preferably discharge the oxygen-containing gas axially as discrete bubbles in the direction of black liquor flow.

Due to the dispersion of gas bubbles into the black liquor in section 12, a further oxidation of the black liquor takes place at a substantially constant free oxygen concentration, and the resulting dispersion of oxygen-depleted gas bubbles in partially oxidized black liquor passes into curved duct section 17. The curved section 17 is preferably in the form of a semi-circle, and transfers the liquor dispersion into a fourth straight linear duct 18, which is parallel with and spaced away from duct section 12. A fourth plurality of spaced apart pipes 19 extend between manifold 14 and duct section 18, and a portion of the oxygen-containing gas stream 13 passes from manifold 14 through pipes 19, and is dispersed into the black liquor in duct section 18 at spaced intervals via curved extensions 20. Due to the spaced apart injection of further oxygen-containing gas bubbles into the black liquor in duct section 18 via axial curved extensions 20, final oxidation of the black liquor phase takes place in section 18 and the concentration of free oxygen in the dispersed gas bubbles phase remains substantially constant, while the concentration of sodium sulfide in the black liquor phase decreases at a substantially uniform proportion or linear rate as the black liquor flows through sections 12 and 18.

The resulting dispersion of oxygen-depleted gas bubbles in fully oxidized black liquor discharged from duct 18 is now substantially free of sodium sulfide, and contains oxidized components including sodium sulfate and sodium thiosulfate. The dispersion is passed downwards from the outlet end of duct 18 into the substantially vertical outlet duct 21. As will appear infra, duct 21 discharges the dispersion of oxygen-depleted gas bubbles in fully oxidized black liquor downwards into a pool or body of black liquor which is maintained in vertical cylindrical retention vessel 22. Fully oxidized black liquor is removed from the lower part of vessel 22 via curved outlet duct 23. An oxygen-depleted gas stream containing entrained liquid droplets is removed from the upper part of vessel 22 via pipe 24, which discharges the gas stream tangentially into cyclonic gas-liquid separator 25, in which the entrained liquid droplets are separated from the gas phase. The resulting liquid-free gas stream is removed from the top of separator 25 via outlet pipe 26, which discharges the gas stream 27 to atmosphere via a stack, not shown.

Referring now to FIG. 2, an elevation view of FIG. 1 is presented. Elements shown in plan view in FIG. 1 have been provided with the same numerals in FIG. 2. The dispersion of oxygen-depleted gas bubbles in fully oxidized black liquor flows downwards from the outlet end of the horizontal duct 18 into the substantially vertical outlet duct 21. The dispersion discharges below the liquor surface and into the body of black liquor 28 which is maintained in vertically oriented cylindrical retention vessel 22. The gas bubbles rise through liquid body 28 and foam formation is inhibited or prevented. The fully oxidized black liquor is removed from the lower part of vessel 22 via outlet duct 23 at a regulated rate which is controlled by valve 29. Fully oxidized black liquor is discharged through valve 29 into duct 30, which conducts the oxidized black liquor stream 31 to subsequent processing such as evaporative concentration and combustion in a furnace, not shown, to produce a solid salts smelt for recycle to the wood pulp process. The valve 29 is regulated to maintain a substantially constant level of liquor in vessel 22 by a signal transmitted by circuit element 32, which may be a pneumatic or electrical signal transfer tube or cable. The signal transferred by element 32 is produced by controller 33, which is provided with sensor elements 34 and 35 which respond, respectively, to high and low black liquor levels in vessel 22, and thus controller 33 serves to maintain a substantially constant black liquor level in vessel 22.

The oxygen-depleted gas phase flowing upwards within the upper part of vessel 22 usually contains entrained liquid droplets, due to passage upwards through the oxidized black liquor body 28. The resulting gas stream containing entrained liquid droplets is removed from the upper part of vessel 22 via pipe 24, which discharges the gas stream into cyclonic gas-liquid separator 25, in which the entrained liquid droplets are separated from the gas phase by cyclonic flow of the gas phase. The resulting liquid-free gas stream is removed from the top of separator 25 via outlet pipe 26, which discharges the gas stream 27 to a stack, not shown. The separated liquid phase settles to the bottom of unit 25, and recycles to vessel 22 via pipe 36.

Referring now to FIG. 3, an alternative embodiment of the invention is illustrated, which may be provided in instances when a foam component is generated within oxidation ducts 2, 8, 12 and 18, and the foam component is not completely eliminated in vessel 22. The dispersion of oxygen-depleted gas bubbles and foam in fully oxidized black liquor flows downwards from the outlet end of the horizontal duct 18 into the substantially vertical outlet duct 21. The dispersion discharges below the liquor surface and into the body 28 of black liquor which is maintained in vertically oriented cylindrical retention vessel 22. The gas bubbles and foam rise through liquid body 28 and a portion of the foam may be separated into gaseous and liquid phases by flowing through body 28. In any case, a gaseous phase and excess foam flow upwards through the upper part of vessel 22, and pass via duct 37 into mechanical foam breaker 38, which is any suitable device for breaking or disintegrating a foam into separate liquid and gaseous phases. Thus, foam breaker 38 may be provided with an internal paddle 39 which is rotated by shaft 40, driven by motor 41. In other instances, unit 38 may be provided with one or a plurality of perforated centrifugal baskets which are rotated to provide a foam breaking effect. In any case, the liquid phase separated from the foam is recycled from unit 38 to vessel 22 via pipe 42, for eventual removal from vessel 22 with the balance of the oxidized black liquor via outlet duct 23 as stream 31.

The residual gas phase produced in unit 38 is substantially free of foam, however this gas phase will usually contain a small proportion of entrained liquid droplets. In this case, the gas phase is passed via upper outlet 43 from unit 38 to cyclonic gas-liquid separator 25, from which the liquid-free gas phase is discharged to atmosphere via upper outlet duct 26 as stream 27, while the separated liquid phase is returned to vessel 22 via pipe 36. In other instances, the gas phase produced in unit 38 may be substantially free of entrained liquid droplets, in which case duct 43 will extend to a stack, not shown, for direct atmospheric discharge of the gaseous phase.

Numerous alternatives within the scope of the present invention will occur to those skilled in the art, besides those mentioned supra. The ratio of oxygen-containing gas flow via streams 3 and 13 to black liquor flow via stream 1 will generally range from about 0.01 to 0.5 cubic meters per liter, with a lower ratio being provided when streams 3 and 13 consist of substantially pure oxygen or oxygen-enriched air. In most instances, the ducts 2, 8, 12 and 18 will be horizontally oriented and will be disposed in a common horizontal plane. Curved duct elements 7, 11 and 17 may be in the form of a semi-circle, or a semi-ellipse, or other suitable curved configuration. In suitable instances, the gas streams passing through ducts 24 or 43 may be substantially free of entrained liquid droplets, in which case unit 25 and its appurtenances may be omitted and the gas stream will be directly discharged to atmosphere via a stack, not shown. The curved extensions 6, 10, 16 or 20 may be omitted in some instances, or disposed to discharge oxygen-containing gas against the flow of black liquor rather than co-currently. When the curved extensions 6, 10, 16 and 20 are omitted, the respective pipes 5, 9, 15 and 19 may terminate at the center or adjacent to the perimeter of the respective duct 2, 8, 12 or 18.

An example of an industrial application of the method and apparatus of the present invention will now be described.

EXAMPLE

An oxidation plant was designed in accordance with the present invention, to handle 1500 liters per minute of weak black liquor derived from an output of 200 tons per day of pulp. It was calculated that the plant will provide essentially 100 percent oxidation efficiency, which will be achieved continuously even though the liquor flow varied from 1150 to 1800 liters per minute and sodium sulfide content varied from 2.3 to 6.6 grams per liter. The liquor to be oxidized contains an average of 16 percent solids concentration including about 4.0 grams per liter of sodium sulfide. The liquor is pumped through the apparatus and the air is distributed with a manifold arrangement at about 70 cm. water gauge static pressure. The ratio of air flow to liquor flow is maintained at about 0.15 cubic meters per liter, and thus the retention time for liquor in the apparatus will be only about 4.2 minutes.

The analysis of the stack gases leaving the oxidation system was calculated to determine whether any of the sulfur bearing gases, such as hydrogen sulfide, mercaptans, dimethyl sulfide, and dimethyl disulfide, were released to atmosphere. The total concentration of sulfur bearing gases was calculated to be below 25.0 ppm, which clearly indicates the performance efficiency of the oxidation system. The gases released to the atmosphere from the oxidation system stack are essentially free of odor.

The oxidized black liquor was to be concentrated in multiple effect evaporators. The condensate from the multiple effect evaporators which would concentrate the oxidized black liquor, including both the condensate from the liquor vapors and that from the jet condensers, amounts to a total of 660 liters per minute. A typical condensate before oxidation was malodorous and it was not possible to discharge it directly in the effluent, or to reuse it in the process. The biochemical oxygen demand (BOD) and pH of condensates before and after oxidation was analyzed. The reduction in BOD was almost 28 percent, whereas the pH of the condensate moved from an acidic 6.5 figure to alkaline conditions of about 9.0. The odor is evidently rendered much less noticeable, thus making the condensate acceptable for use in the process as hot water, such as for brown stock washing. This results in a considerable saving in heat, as well as the elimination of a source of pollution.

In the commercial installation, a single stage venturi evaporator-scrubber is to be provided following the recovery furnace in which concentrated black liquor is burned to a smelt. In this venturi, simultaneous evaporation and dust scrubbing is done. The flue gases leaving the stack were the biggest source of air pollution, as both malodorous sulfur bearing gases and salt cake dust were released to the atmosphere. The concentration of hydrogen sulfide released to the atmosphere before installation of the oxidation system varied from a minimum of 570 ppm to a maximum of 1160 ppm. After the oxidation system is installed, there is a noticeable odor reduction. The analysis of the stack gases indicated that the concentration of hydrogen sulfide is reduced by 98.5 percent. This significant reduction in the concentration of hydrogen sulfide clearly proves the effectiveness of oxidation as practiced in the present invention.

At the proposed commercial installation, the sulfidities of both green and white liquor were to be increased by oxidation. The average sulfidity of green and white liquor without oxidation was 18.2 and 22.6, respectively. With the oxidation of black liquor, the sulfidity of green liquor should increase from 18.2 to about 27.1, a 47.1 percent increase, whereas the sulfidity of white liquor will increase from 22.6 to about 27.9, a 23.4 percent increase. This significant change in sulfidity agrees with low sulfur losses in the recovery furnace stack gases.

Finally, the increase in sulfidity due to oxidation also results in the lowering of lime requirement for the causticizing plant. On the average, the lime requirement is decreased by 0.01 kg. of lime per liter per minute of green liquor, which amounts to a 15.4 percent reduction. This is equivalent to an average reduction of 213 kg. of lime per hour. This lower lime requirement also reduces the load on the lime kiln and saves the fuel for reburning the lime. This amounts to $17,200 per year, assuming fuel cost at 2.4 cents per liter. In addition, the operating power requirement for the oxidation plant including air fan and liquor pump was calculated to be only 99 horsepower, equivalent to 0.495 HP per ton of pulp produced. Assuming an average cost per horsepower per year to be $40, the annual operating cost will be only $3,960. This will be paid off in manifold in terms of sulfur recovery, lime savings and other benefits of oxidation.

I claim:

1. An apparatus for the oxidation of liquids which comprises a first straight linear duct, means to pass unoxidized liquid into an inlet end of said first duct, a second straight linear duct, said second duct being parallel with and spaced away from said first duct, a curved duct, said curved duct extending between the liquid outlet end of said first duct and an inlet end of said second duct, whereby liquid flows from said first duct to said second duct, a straight linear gas manifold, said manifold being disposed between and parallel with said first and second ducts, means to pass an oxygen-containing gas into said manifold, a first plurality of pipes, said first pipes being spaced apart with each of said first pipes extending between said manifold and said first duct, whereby oxygen-containing gas is passed through said first pipes and dispersed into liquid in said first duct at spaced intervals and liquid is oxidized, a second plurality of pipes, said second pipes being spaced apart with each of said second pipes extending between said manifold and said second duct, whereby oxygen-containing gas is passed through said second pipes and dispersed into liquid in said second duct at spaced intervals and liquid is further oxidized, a substantially vertical outlet duct, said vertical outlet duct extending downwards from the outlet end of said second duct and serving to conduct a dispersion of oxygen-containing gas in fully oxidized liquid downwards into a vessel, the lower outlet end of said vertical outlet duct terminating within said vessel, means to remove oxidized liquid from the lower part of said vessel, said oxidized liquid removal means being regulated whereby the level of liquid in said vessel is maintained above the lower outlet end of said vertical outlet duct, and means to withdraw a resulting oxygen-depleted gas stream from the upper part of said vessel.

2. The apparatus of claim 1, in which said first and said second straight linear ducts are horizontal.

3. The apparatus of claim 1, in which said first and said second straight linear ducts are disposed in a common horizontal plane.

4. The apparatus of claim 1, in which said curved duct is in the form of a semi-circle.

5. The apparatus of claim 1, in which said oxygen-containing gas is selected from the group consisting of air, oxygen-enriched air and substantially pure oxygen.

6. The apparatus of claim 1, combined with a mechanical foam breaker, means to pass said oxygen-depleted gas stream containing entrained foam through said mechanical foam breaker, and means to recycle the resulting liquid separated from said oxygen-depleted gas stream to said vessel.

7. The apparatus of claim 1, combined with a cyclonic gas-liquid separator, means to pass said oxygen-depleted gas stream containing entrained liquid droplets through said cyclonic separator, and means to recycle the resulting liquid separated from said oxygen-depleted gas stream to said vessel.

8. The apparatus of claim 1, in which said first and said second plurality of pipes terminate respectively within said first and said second duct with curved extensions, whereby said oxygen-containing gas is discharged from said pipes and centrally dispersed into said liquid within said ducts in the direction of liquid flow.

9. The apparatus of claim 1, in which said liquid is black liquor derived from the processing of wood pulp.

* * * * *